United States Patent [19]
Witkoski

[11] 3,850,063
[45] Nov. 26, 1974

[54] VALVED PILLAR POST FOR GLASS CUTTING WHEEL

[75] Inventor: Edward Joseph Witkoski, Burlington, Conn.

[73] Assignee: The Fletcher-Terry Company, Farmington, Conn.

[22] Filed: Oct. 17, 1973

[21] Appl. No.: 407,311

[52] U.S. Cl........................... 83/12, 83/169, 83/582, 83/699
[51] Int. Cl.......................... B26d 3/08, C03b 33/10
[58] Field of Search............. 83/12, 6, 169, 22, 699, 83/582; 30/164.95

[56] References Cited
UNITED STATES PATENTS

| | | | |
|---|---|---|---|
| 1,988,565 | 1/1935 | Owen............................. | 83/169 UX |
| 3,399,586 | 9/1968 | Insolio et al. ...................... | 83/12 X |
| 3,461,755 | 8/1969 | Gerew et al. ...................... | 83/169 X |
| 3,742,793 | 7/1973 | Gray et al............................ | 83/12 X |

*Primary Examiner*—Frank T. Yost
*Attorney, Agent, or Firm*—McCormick, Paulding & Huber

[57] ABSTRACT

A self-aligning pillar post of the type used in a glass cutting apparatus has a bifurcated head portion in which the glass cutting wheel is rotatably mounted, and has a stem portion which is received in a sleeve for limited rotational travel and for limited axial movement in the vertical direction. A Bellville spring urges the head downwardly in the sleeve so that a cross pin seats in a V-shaped slot to align the head in a predetermined direction. The pin is adapted to be raised upwardly out of the slot as the glass cutting wheel engages the glass surface to be cut allowing the head to rotate within predetermined limits. A vertically extending passageway is defined in the head, and a valve element within the stem portion of the head is adapted to be unseated in response to upward movement of the head to allow cutting fluid to pass downwardly onto the cutting wheel and onto the glass surface whenever the cross pin is so raised. A spring is provided to urge the valve element toward its seated position, and the upward motion of the head with respect to the sleeve is amplified by a mechanical lever in order to open the valve against the bias of said spring.

7 Claims, 4 Drawing Figures

PATENTED NOV 26 1974 3,850,063

VALVED PILLAR POST FOR GLASS CUTTING WHEEL

BACKGROUND OF THE INVENTION

Sheet glass is commonly cut by a method of scoring the glass by a cutting wheel, after which the glass is flexed about the score so as to be broken along the score line. U.S. Pat. No. 3,160,043 issued Dec. 8, 1964, and assigned to the assignee herein, discloses a self-aligning pillar post of the type adapted to mount a glass cutting wheel for use in a machine for scoring glass sheet. This patent discloses a glass cutting wheel in a bifurcated head with the axis of the cutting wheel offset slightly from the vertical axis of the stem portion of the head. A stem portion of the head is rotatably received in a sleeve, which sleeve is mounted in a cross carriage for purposes of traversing the glass sheet. As so configured, the glass cutting wheel exhibits a castering action whereby the plane of the cutting wheel tends to remain aligned with the direction of movement of the carriage as the device traverses the glass sheet. The pillar post disclosed in the above mentioned patent further includes means for aligning the cutting wheel in a predetermined direction even before the cutting wheel contacts the glass sheet. The cutting wheel and head are raised upwardly as the wheel contacts the glass sheet and the sleeve accommodates this vertical motion and causes the cutting wheel to revert to a castering free swiveling configuration after being so raised. Thus, the cutting wheel and its associated head are adapted to rotate freely, within predetermined limits, after having been raised as a result of the wheel contacting the glass sheet.

In the scoring of glass sheets by rotative cutting wheels of the type described above it has been found that fissures develop along the line of score, and that residual stresses within the glass are modified, particularly adjacent the surface of the glass sheet, during the scoring operation. One of the manifestations of such stress modifications is the tendency for the glass surface to develop flakes, or slivers, or even chips along the line of score. Common practice calls for the introduction of so-called cutting fluids which serve to protect the line of score by delaying the development of these flakes, chips or slivers. Generally, a combination of kerosene and oil is used for this purpose. This fluid has been applied to the glass along the line of score by various prior art means. One method well known in the art is to drip this fluid through a bore or passageway approximately at the center line of the pillar post or even directly onto the cutting wheel. The latter practice accomplishes the additional function of lubricating the axle of the cutting wheel as it scores the glass. A major objection to the use of cutting fluid in the scoring of glass sheet resides in the fact that it is quite difficult to control the flow of fluid. If a valve is provided at any distance from the cutting wheel, there will be a time lag between opening and closing of the valve and the stopping and starting of the cutting fluid at the cutting wheel. Also, when multiple pillar posts are provided in a cross carriage in the type used in some glass scoring machines, the means for operating such valves can become quite complex.

The aim of the present invention is to provide a pillar post in which cutting fluid is introduced directly onto the scoring wheel only when the glass is actually being cut. This result is achieved by taking advantage of the limited vertical motion referred to above with reference to the disclosure in the prior art U.S. Pat. No. 3,160,043 referred to above, to operate within the pillar post itself. The valve of this disclosure is operated directly by the limited vertical motion of the cutting wheel as it engages and starts to score the glass sheet.

SUMMARY OF THE INVENTION

This invention relates generally to apparatus for scoring sheet glass, and deals more particularly with an improved self-aligning pillar post of the type adapted to rotatably support a cutting wheel and wherein a valve is provided within the pillar post to control the flow of cutting fluid to the scoring wheel and to the surface of the glass being cut. More specifically, this invention resides in a self-aligning pillar post configuration wherein the bifurcated holder for the cutting wheel is adapted to move vertically in order to accomplish the self-aligning feature and this motion is amplified as a result of a mechanical lever so as to operate a valve provided within the pillar post itself and to thereby control the flow of fluid to the cutting wheel.

DETAILED DESCRIPTION

Figure 3:
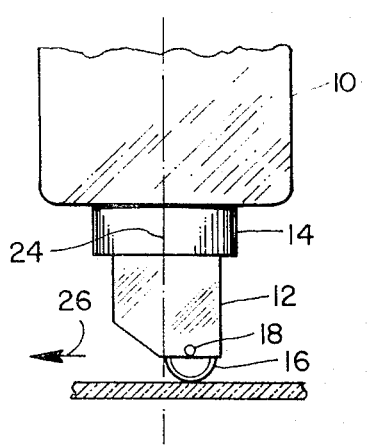
FIG. 3 is an elevational view of the device shown in FIGS. 1 and 2 provided in a carriage of the type adapted to traverse the glass cutting wheel with respect to a sheet of glass.
Figure 4:
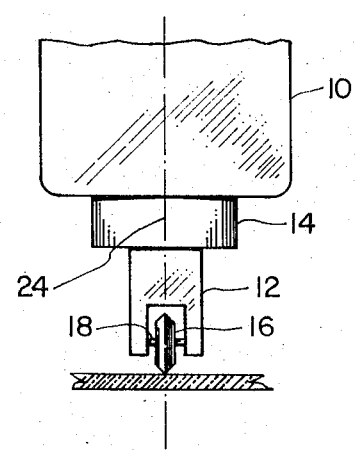
FIG. 4 is an end view of the device shown in FIG. 3.

Turning now to the drawing in greater detail and referring more particularly to FIGS. 3 and 4, a carriage is indicated generally at 10, being of the general type adapted to traverse a flat sheet of glass to be scored, in a conventional glass cutting machine. A bifurcated head 12 is provided in a sleeve 14, which sleeve 14 is fixedly secured to the carriage 10, as for example by a bayonet connection or the like.

As best shown in FIG. 4 the lower bifurcated end of the head 12 defines a slot in which the cutting wheel 16 is rotatably mounted on an axle 18. The upper end of the head 12 includes an upstanding stem portion, best shown in FIGS. 1 and 2 at 20, which stem portion 20 is generally cylindrical and is rotatably mounted in the lower end of the sleeve 14 by means of a bearing 22. As so constructed and arranged, the head 12 is adapted to rotate on the axis 24 best shown in FIGS. 3 and 4 which axis is spaced slightly, in the horizontal direction, from the axle 18 associated with the cutting wheel 16 to provide a castering or swivel action for the cutting wheel as the carriage 10 traverses the glass sheet in the direction of the arrow 26 in FIG. 3.

As described in detail in the above-mentioned U.S. Pat. No. 3,160,043, means is provided for aligning the head 12 in a predetermined direction with respect to the sleeve 14 prior to initiation of the score or cut, and such means will now be described, insofar as necessary to a proper understanding of the invention herein. The degree of angular rotation, or swivel of the head 12 with respect to the sleeve 14, is limited by providing a pin 26 in an upwardly open diametrically extending slot or opening 28 defined by the sleeve 14. The width of the slot 28 is somewhat greater than the diameter of the pin 26 to allow limited angular rotation of the pin 26 therein. The pin 26 is carried by the upper end of the stem portion 20 of the head 12, and the lower end of the slot 28 is generally V-shaped to cause the head 12 to align itself in a predetermined orientation when the pin 26 is located in the lower end of said slot 28, as shown in FIG. 1.

When the glass cutting wheel 16 engages the glass G, the wheel and its associated holder 12 will move upwardly relative to the sleeve 14 raising the pin 26 out of the V-shaped end of the slot 28 with the result that limited angular travel of the head in its associated sleeve is possible as defined by the width of said slot 28. Spring means is provided for urging the head 12 downwardly toward the position shown in FIG. 1. Engagement of the cutting wheel 16 with the glass G overcomes this spring force, as the head 12 assumes the FIG. 2 position. Preferably, said spring means takes the form of a Bellville type spring washer 30 which acts between the underside of a flange 32 defined in the annular sleeve 14 and a series of washers 34 provided between the underside of the Bellville spring washer 30 and an upwardly facing flange defined for this purpose on the stem portion 20 of the head 12.

In accordance with the present invention, a fluid passageway is defined within the head 12 and communicates with a tube 36 secured in the carriage 10 for providing fluid to the cutting wheel 16. This passageway is adapted to be opened or closed in response to the limited vertical motion of the head 12 with respect to the sleeve 14 by novel means to be described. A cylindrical valve element or plug 38 is provided in the passageway for this purpose. The plug 38 is connected to the stem portion 20 of the head by mechanical motion amplifying means effective to cause opening movement of said valve element 38 in response to upward movement of the head 12 with respect to the sleeve 14.

Figure 1:
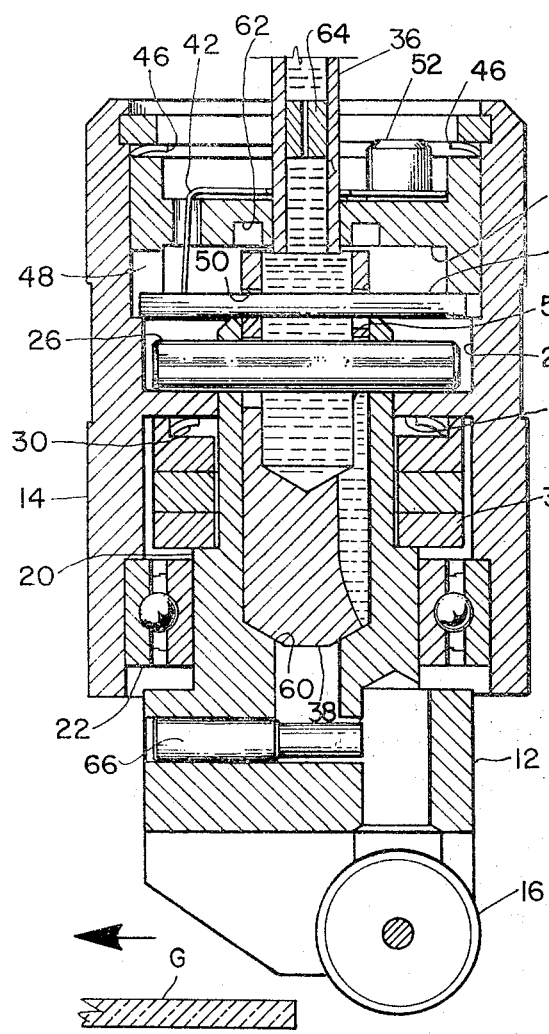
FIG. 1 is a vertical sectional view of a self-aligning pillar post incorporating the present invention, the valve element being shown in its closed position, and the cutting wheel being shown just prior to engagement with the glass sheet to be scored.
Figure 2:
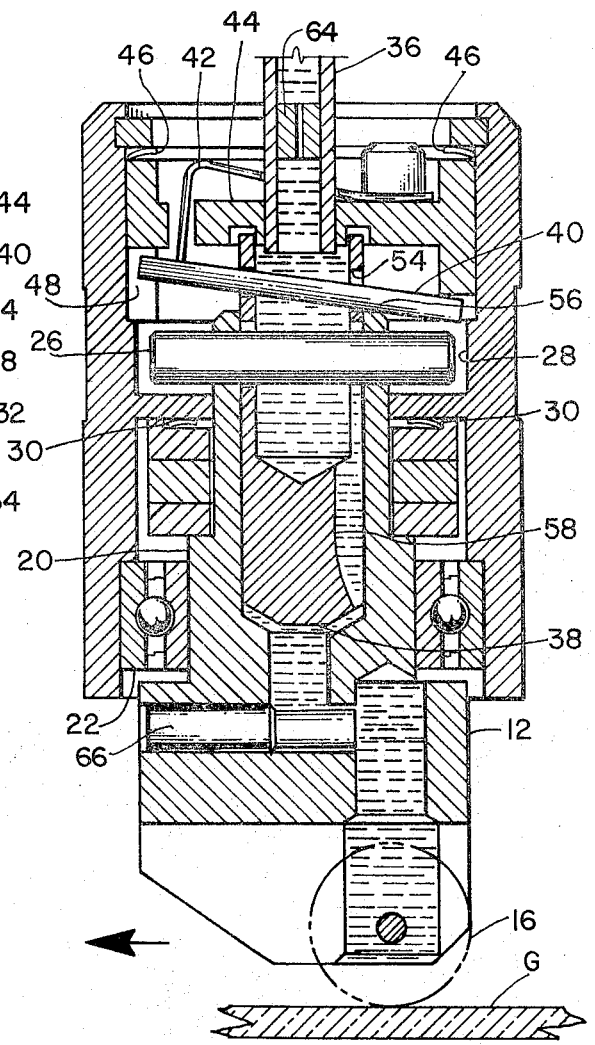
FIG. 2 is a vertical sectional view similar to FIG. 1 but shows the valve in its open position and the cutting wheel in phantom lines in engagement with the glass sheet for scoring purposes.

Preferably, and as shown in FIGS. 1 and 2, said motion amplifying means includes a lever 40, which lever extends generally diametrically across the opening defined by the annular sleeve 14, and which lever also extends through aligned slots in the upper end of the valve element 38. As shown in FIG. 1 the right hand of the lever 40 is restrained to permit substantially pivotal motion only of the lever from and to the relative positions shown in FIGS. 1 and 2. The leaf spring 42 has one end indirectly secured to the sleeve by means of the insert 44 which is provided in the upper end of the sleeve. The opposite end of the leaf spring 42 engages the left hand or free end of the lever 40 to urge said lever downwardly toward the FIG. 1 position. Actually, the insert 44 is adapted to move slightly in an axial direction within the sleeve 14, but said insert is urged downwardly toward the position shown in FIG. 1 by a Bellville spring 46. The lower end of the insert 44 cooperates with the internal side wall of the sleeve 14 to define a cavity for loosely receiving the right hand end portion of the lever 40 in the pivotal manner described above. A clearance opening 48 is defined in the opposite side of the insert member 44 to allow the lever 40 to move from and to the relative positions shown in FIGS. 1 and 2.

More specifically, the leaf spring 42 is generally L-shaped having a depending leg which engages the upper side of the left hand end of the lever 40 to urge the lever toward a position whereby the lever engages an abuttment surface defined in the upper tubular end portion of the valve element 38, said surface being defined by the slot 50. The valve element is thereby urged toward a closed position as shown in FIG. 1. The lever 42 has its other leg secured to the insert 44 by a screw 52. As shown in FIGS. 1 and 2, the lever 40 extends across the upper tubular end portion of the valve element 38 through the slot 50 mentioned above, and also through an aligned slot of somewhat greater vertical dimension 54 defined in the opposite side wall of said tubular portion valve element. The right hand slot 54 being of somewhat greater vertical dimension than the left hand slot 50 provides a clearance opening for the lever 40 as the lever moves from its FIG. 1 to its FIG. 2 position.

The lever 40 is thus raised from its FIG. 1 position to its FIG. 2 position as a result of upward movement of the head 12. The stem portion of the head 12 has an upper abuttment surface 56 which engages the underside of the lever 40 in order to urge the lever from the FIG. 1 position to the FIG. 2 position and thereby open the valve and allow fluid to pass downwardly from the tube 36, through the passageway defined in the head, and to the cutting wheel 16. As previously mentioned, the lever 40 also engages the upper end of slot 50 in the valve element 38 to move the valve element upwardly a greater distance than that traveled by the head 12 in its upward movement from the FIG. 1 to the FIG. 2 position. The valve element 38 comprises a generally cylindrical plug having an upwardly open bore defined in its upper tubular portion, and having a side opening slot 58 defined in its lower end portion, which slot 58 will allow fluid to pass from the tubular upper portion generally downwardly through the passageway defined in the stem portion 20 of the head 12 at least when the valve element 38 is in the opened position. In the valve closed position of FIG. 2 the side slot 58 is isolated from the lower portion of the passageway in the head, the lower end of the valve element 38 having a conical surface which cooperates with a conical valve seat 60 defined by the inner end of a bore defined for this purpose in the stem portion 20 of the head 12.

It should also be noted that the cutting fluid or oil used to lubricate the various moving parts within the valved pillar post of the present invention. More particularly, the upper tubular end of the valve element 38 is adapted to fit loosely into an annular groove defined for this purpose in the underside of the insert member 44. This groove 62 is open when the valve element 38 is in its FIG. 1 position, allowing fluid to pass over the upper end of the tubular upper portion of the valve element and downwardly into the V-shaped groove which receives the cross pin 26. Some fluid will also pass downwardly between the stem portion 20 and along the internal wall of the sleeve member 14 to lubricate these portions and to assure continued freedom of movement thereof both rotationally and axially. Finally, said fluid will also reach the bearing 22 to lubricate it also. However, the quantity of fluid reaching these parts will be limited by virtue of the fact that fluid will only be allowed to pass into these areas when the valve element 38 is in its closed position. When the valve element 38 is in its opened position, the upper end of the tubular upper portion of the valve element 38 will tend to restrict the flow of fluid as a result of the annular groove 62 provided for this purpose in the underside of the insert 44.

By way of summary then, during the scoring operation the offset location of the cutting wheel 16 with respect to the central axis 24 of the pillar post causes the cutting wheel to align itself in a castering or swivel action with the path of the carriage 10 across the glass sheet to be scored. However, when the wheel is in the position shown in FIG. 1, that is, prior to making contact with the glass, the cutting wheel 16 is held in a predetermined angular orientation with respect to the sleeve 14 and hence to the carriage 10 as a result of the pin 26 being received in the V-shaped slot 28 defined for this purpose in the sleeve. The pin is supported by the stem portion of the head 12 and this stem portion 20 defines an upwardly opened cylindrical bore in which a valve element 38 is provided to seat against the valve seat 60 and to selectively stop the flow of cutting fluid downwardly through the internal passageway in the head 12. As the cutting wheel 16 contacts the glass G the holder 12 moves upwardly with respect to the sleeve and a motion amplifying device moves the valve element 38 upwardly with respect to the head 12 allowing fluid to pass downwardly through the passageway. Spring biasing means is provided for urging the valve element toward its closed position, and for urging the head 12 toward its downward limit of travel as shown in FIG. 1.

Two flow restrictors are provided in the passageway for controlling the rate of flow of the fluid through said passageway. More particularly, an orifice plug 64 is provided in the tube 36 to restrict the flow of fluid especially when the valve is closed as shown in FIG. 1. A needle or pin 66 is provided downstream of the valve element 38 to control the rate of flow of fluid when the valve is opened as shown in FIG. 2. Preferably, these flow restrictors 64 and 66 define orifices having a cross sectional area in the range between 2 circular mils and 40 circular mils depending upon the viscosity of the fluid.

I claim:

1. A valved self-aligning pillar post for use in a glass cutting machine and comprising in combination:
   a. a head having a lower bifurcated portion in which the glass cutting element is adapted to be rotatably mounted, said head having an upstanding stem portion,
   b. an elongated annular sleeve in which said head stem portion is received for at least limited angular rotation and in which said head stem portion is slidably received for limited vertical movement in said sleeve,
   c. spring biasing means acting between said head and said sleeve to urge the head downwardly,
   d. said head having a passageway defined in part by a vertical bore in said stem portion, and said bifurcated portion defining a lower region of said passageway which communicates with the space between the furcations and in the area of the glass cutting element,
   e. a valve element in said stem bore and having a lower end adapted to seat in the lower end of said bore to close said passageway,
   f. mechanical motion amplifying means connecting said valve element to said sleeve to move said element upwardly in response to upward movement of said head to open said passageway in response to upward movement of the head.

2. A valved pillar post in accordance with claim 1 further characterized by a pin and slot connection between said head and said sleeve to restrict the angular rotational travel of said head with respect to the sleeve, said slot having a V-shaped end to align said pin in a predetermined angular orientation and hence to align said cutting element when the head is in its downward position and said passageway is closed.

3. A valved pillar post in accordance with claim 1 wherein said mechanical motion amplifying means connecting said valve element to said sleeve more particularly comprises
   a. a lever extending generally diametrically across said annular sleeve and having one end restrained to permit substantially pivotal motion only of said lever with respect to said sleeve,
   b. said stem portion of said head having an upper abutment surface engageable with said lever to lift the lever upwardly in response to upward vertical movement of said head in said sleeve, and
   c. said valve element having an abutment surface engageable by said lever to raise said valve element in said head stem portion.

4. A valved pillar post in accordance with claim 3 further characterized by spring biasing means for urging said valve element downwardly by acting between said lever and said sleeve.

5. A valved pillar post in accordance with claim 4 wherein said valve element comprises an elongated cylindrical plug having a lower end defining a side opening slot which is closed when said valve element is seated in the lower end of said bore, and an upper end of said valve element of tubular configuration, and said abutment surface of said valve element comprising one end of a slot in said tubular upper portion, and a tube carried in fixed relation to said sleeve and slidably received in said tubular upper portion of said valve element for supplying fluid to said passageway.

6. The device defined in claim 1 further characterized by at least one flow restrictor in said fluid passageway for controlling the rate of fluid flow when the valve is open.

7. The device defined in claim 6 wherein said flow restrictor defines an orifice having a cross-sectional area in the range between 2–40 circular mils.

* * * * *